Dec. 14, 1965  R. SCHLAGETER  3,223,699
PROCESS FOR PREPARING ALKYLATED POLYSACCHARIDE BINDING AGENTS
Filed March 26, 1962
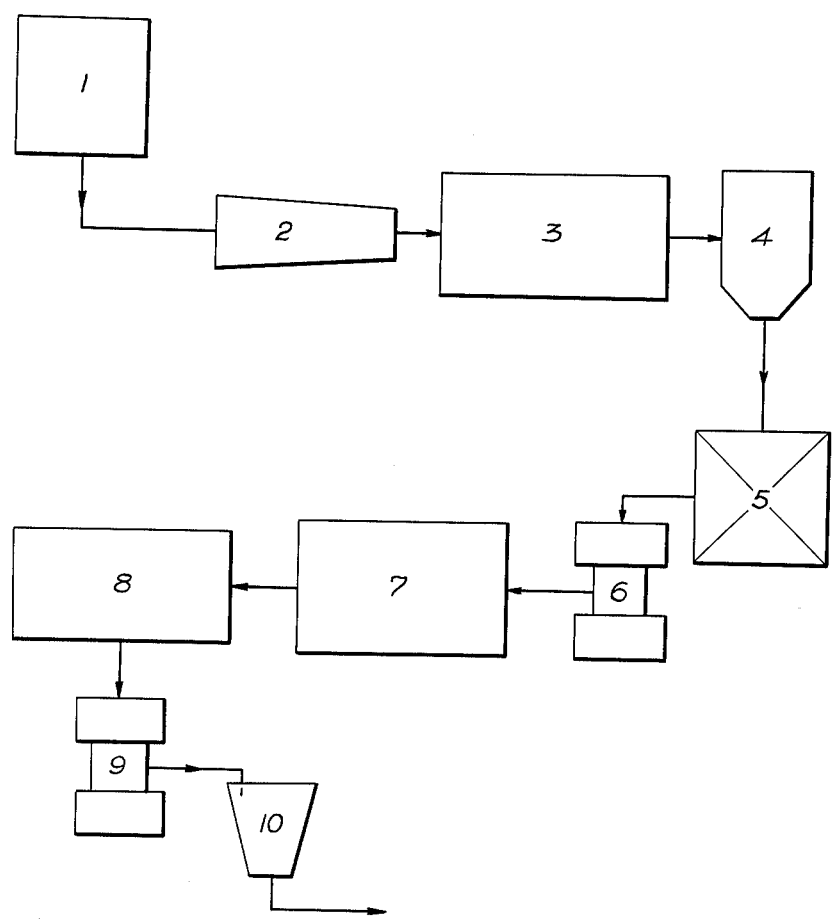

United States Patent Office 3,223,699
Patented Dec. 14, 1965

3,223,699
PROCESS FOR PREPARING ALKYLATED POLYSACCHARIDE BINDING AGENTS
Rosa Schlageter, Vienna, Austria, assignor to Etablissement Ena, Vaduz, Liechtenstein
Filed Mar. 26, 1962, Ser. No. 182,202
5 Claims. (Cl. 260—209)

The present invention relates to a process for the production of binding agents, particularly of binding agents used in the production of cellulose products, such as paper, cardboard, pasteboard, and the like.

In the production of paper, cardboard, pasteboard and similar cellulose products, binding agents of various types are being used, e.g., starch and starch derivatives, gum products (particularly galactomannanes), carboxymethyl cellulose, alginates, soy proteins and various synthetic resins.

The present invention now aims at the production of a new binding agent which is particularly suited for the production of paper, cardboard, pasteboard and similar cellulose products. The present invention is an improvement of a known process in which polysaccharide containing substances are reacted with alkylating agents or hydroxyalkylating agents. With such known process, the invention essentially resides in that seeds of plants of the subfamily Amhersticeae of the Leguminosae, particularly of *Tamarindus indica*, are ground and treated with alkylating or hydroxyalkylating agents. A raw material is thus made use of for the production of binding agents, which raw material is, on the one hand, readily accessible and cheap, and which, on the other hand, furnishes binding agents which have good bonding properties and which are particularly suited for the production of cellulose products, such as paper, cardboard, pasteboard or the like. The particular suitability of the binding agents produced in accordance with the process of the present invention is probably the result of the fact, that, in the product obtained in accordance with the present process, there is present a mixture of cellulose ethers, etherified proteins and etherified fats, which mixture shows particular suitability for the production of cellulose products.

The process according to the present invention is particularly suited for the production of a binding agent which is to be used as an additive to the pulp in a pulp preparing plant or pulp beating equipment, e.g., in beaters, particularly in beating engines producing whole pulp. In the production of paper, a sizing substance or size is added to the pulp in order to increase the tensile strength, the folding endurance index and the bursting pressure of the paper. It is known to use as sizing substances starch-base products, such as corn starch, potatoe starch, or rice starch, or gum-base products, (particularly galactomannanes), or carboxymethyl cellulose. It has also been proposed to add to the pulp ground carob beans (seeds of St. John's bread) or guarana beans. It has furthermore been proposed to add to the pulp to be processed in beaters, sizing substances on synthetic resin base, e.g., in latex form, or urea-formaldehyde resins and phenolformaldehyde resins. Provided these known additives are native substances or derived from native substances, satisfactory tensile strength, satisfactory folding endurance indices and bursting pressures of the paper may be expected, the resistance to water of paper made with such substances being insufficient, however, in most cases. When synthetic resins are added as sizing agents to the pulp to be processed in beaters, one disadvantage of such resins is their relatively high price, another disadvantage being in some cases, e.g., where formaldehyde resins are used, the necessity of an after-treatment of the paper for the purpose of setting the resin.

The present invention now aims at providing a new additive for the production of paper, cardboard and the like cellulose products, which additive is readily produced, easily processed, and which, in spite of its low cost price, allows to obtain a high resistance of the paper or the like to water, as well as the required folding endurance indices and bursting pressures.

When producing a binding agent which is to be added to the pulp in pulp beaters, in accordance with the present invention, the preferred procedure, when assuming a polysaccharide content of the seed meal of about 70%, is to use 0.1 to 0.4 mol of alkylating agent or hydroxyalkylating agent, respectively, per mol of pyranose, preferably 0.2 to 0.3 mol of alkylating agent or hydroxyalkylating agent, respectively, per mol of pyranose contained in the polysaccharide. Due to the fact that, according to the present invention, the pyranose components constituting the polysaccharide molecules, and together with them, the fats and albumines contained in the meal, are alkylated or hydroxyalkylated to a small extent only, a substance is obtained, which, when added to the pulp, is readily distributed therein, so that bonding of the pulp fibres is readily accomplished. This is the result of the small extent of alkylation or hydroxyalkylation, respectively, of the substance of the seeds, which gives a product which is readily swellable but not yet soluble in water. Furthermore, the substances which are produced in this manner and which are added to the pulp in beaters, have the advantage that they are low-priced because they can be produced from native substances at low cost, and that smaller quantities may be used than is the case with known substances used for the same purpose.

The process according to the present invention is further particularly suited for the production of a binding agent for the surface refinement of cellulose products, such as paper, cardboard, pasteboard or the like.

For the surface refinement of paper, cardboard, pasteboard or the like, or as binding agents for coating compositions for the surface refinement of paper, cardboard, pasteboard or the like, starch, starch derivatives, carboxymethyl cellulose, alginates, soy proteins, various synthetic resins, and the like, are being used nowadays. The present invention now aims at the production of a new binding agent suited for surface refinement of cellulose products, such as paper, cardboard, pasteboard or the like. The preferred procedure for producing such binding agent in accordance with the present invention, is to use 0.1 to 5 mols of alkylating or hydroxyalkylating agent, more preferably 0.5 to 2 mols, particularly 1 mol of alkylating or hydroxyalkylating agent, per mol of pyranose, when assuming a polysaccharide content of the seed meal of 70%. The product obtained in this manner contains a mixture of cellulose ethers, of etherified proteins and etherified fats, which mixture is particularly suited for the surface refinement of cellulose products. Of course, not only the polysaccharides are etherified during the alkylation or hydroxyalkylation, but the proteins and fats contained in the seed meal together with the polysaccharides, are etherified as well. With *Tamarindus indica*, a polysaccharide content of 70% is common.

According to the present invention, alkylene oxides, dialkyl sulfates, alkyl halides, alkylene halohydrins or diazo alkyl compounds can be used as alkylating or hydroxyalkylating agents, respectively. Ethylene oxide, propylene oxide, ethylene chlorohydrin, propylene chlorohydrin in alkaline solution are used for hydroxyalkylation preferably. When using such solutions as hydroxyalkylating agents, it is possible to hydroxyalkylate the substances contained in the seeds, viz. albumines, cellulose and fats, to various extents, depending upon the quantities of the alkylene oxides or the alkylene halohydrins applied. It is thus possible to adapt the characteristics of the binding agents produced according to the present invention to different requirements. In that case where the binding agent produced in this manner is to be used for the surface refinement of cellulose products, such characteristics are the pore filling power, the wettability and the dispersing action on solids, e.g., pigments to be suspended in coating compositions. If, on the other hand, the binding agent produced in this manner, is to be used as an additive to the pulp in beaters, such characteristics are the swelling property and the ability to impart to the paper the required resistance to water.

In accordance with the present invention, an aqueous-alcoholic solution, preferably an aqueous-methanolic solution of a basic substance, preferably of sodium hydroxide, can be used as an alkaline solution. By using alkylating agents or hydroxyalkylating agents which impart alkalinity to the reaction mixture, the reaction rates are increased to economical rates, the presence of alcohol in the reaction mixture furthermore resulting in an intermediary action of dissolving among the partners to the reaction. In other words, when using an alcoholic solution, the course of the reaction will approach that of a homogeneous reaction.

When using alkylene oxides as hydroxyalkylating agents, hydroxyalkylation is suitably effected at an alkalinity corresponding to a sodium hydroxide concentration of 1–3%, preferably of about 2%, based on the weight of the seed meal.

When using alkyl halides or alkylene halohydrins, the alkylation or hydroxyalkylation, respectively, is suitably effected at an alkalinity corresponding to a sodium hydroxide concentration of 1 to 3%, preferably of about 2%, based on the weight of the seed meal, such quantities of basic substance being, however, added in addition, which are stoichiometrically sufficient to neutralize the halogen hydride split off in the course of the reaction. The addition is preferably effected in a continuous manner in dependence on the base requirements of the reaction mixture.

In accordance with the present invention it appears to be suitable to effect the alkylation or hydroxyalkylation, respectively, at increased temperatures, preferably at temperatures of about 40–150° C., e.g., at 80–90° C., working at the vapour pressure of the reaction mixture, which may be as high as 6 atmospheres. Within the above temperature ranges, the alkylation or hydroxyalkylation can be effected within 3–12 hours, particularly within 5–8 hours, preferably with simultaneous grinding. When adhering to such mode of operation, complete break-up of the ground product can be expected.

Upon alkylation or hydroxyalkylation, respectively, the reaction mixture may be neutralized, preferably by means of gaseous hydrogen chloride of carbon dioxide, whereupon the neutralized reaction mixture may be evaporated to dryness, completely dried, preferably on air, and then ground.

Grinding of the seeds prior to alkylation or hydroxyalkylation, respectively, is preferably effected to grain sizes corresponding to DIN sieves 70 to 80 (DIN= German Industrial Standards). Such degree of fineness assures an effective and uniform attack of the alkylating or hydroxyalkylating agent, respectively, and is of particular advantage in that case where the binding agent will be used for the production of coating compositions for the surface refinement of paper, cardboard or pasteboard, or, e.g., in the case where the binding agent is to be used as additive to the pulp in pulp processing equipment when it is desired that such additive shows only a low but uniform degree of alkylation.

The husks of the seeds used in the process according to the present invention are of dark shade, wherefrom a dark shade of the binding agent or coating composition will result. According to a preferred embodiment, the invention therefore provides to husk the seeds prior to grinding, and to bleach the husked seeds, preferably by means of an alkaline solution of hydrogen peroxide, whereby the brightness of the binding agent is improved. Prior to grinding, the husked and bleached seeds are suitably dried to a water content of 10–20% in order to obtain a ground product of satisfactory fineness. Such drying may be effected at temperatures of 100 to 300° C., e.g., at a temperature of 150° C.

A further development of the process according to the present invention, particularly in its application to the production of additives for pulp beaters, consists in that borax, starch or glyoxal are added, either alone or in combination, to the reaction mixture, preferably towards the end of the reaction, or to the reaction product during the course of its further processing. By adding borax to the reaction mixture, it becomes possible to save alkali, and borax also has an accelerating effect on the bonding and setting of the sizing agents in the dryer section of the paper machine. The action of the added borax in the above sense is of particular advantage in the case where, in addition to borax, glyoxal is added to the binding agent. Glyoxal is assumed to react particularly with the partly etherified or hydroxyalkylated albumines under cross-linkage, and this is assumed to be the reason why paper made with binding agents being added to the beaters, which were produced in accordance with the present invention, shows particularly good strength and water resistance characteristics in the case where glyoxal has been used.

A preferred embodiment of the present process consists in using borax in quantities of 1–10%, preferably about 5%, based on the dry substance of the reaction product, and/or in using glyoxal in quantities of 1–10%, preferably about 5%, based on the dry substance of the reaction product.

The process according to the present invention is further illustrated by the following examples.

*Example 1*

20 parts by weight of seed meal of *Tamarindus indica* are mixed with 80 parts by weight of water to form a pasty mass. Added to this paste are 2 parts by weight of 30% sodium hydroxide solution and 1 part by weight of propylene oxide. After thorough mixing, the paste is allowed to stand for two days whereafter it is dried and ground. The product obtained shows excellent swelling properties in water, and, when added to paper pulp, will give paper of excellent resistance to water, and at the same time high strength.

A product having similar properties is obtained by using an equivalent quantity of ethylene oxide instead of propylene oxide.

By effecting the reaction in a pressure vessel at 80° C., the reaction time can be reduced considerably.

*Example 2*

20 parts by weight of seed meal of *Tamarindus indica* are mixed with 80 parts by weight of water to form a pasty mass. Added to this paste are 2 parts by weight of 30% sodium hydroxide solution and 10 parts by weight of propylene oxide. After thorough mixing, the paste is allowed to stand for two days whereafter it is dried and ground. The resulting product is completely soluble in cold water and is very well suited as binding agent for the surface refinement of cellulose products, such as paper, cardboard, pasteboard or the like.

A product having similar properties is obtained by using an equivalent quantity of ethylene oxide (8.9 parts by weight) instead of propylene oxide.

By effecting the reaction in a pressure vessel at 80° C., the reaction time can be reduced considerably.

*Example 3*

200 parts by weight of seed meal are ground in a ball mill together with 15 parts by weight of 30% sodium hydroxide solution. The homogenized mass thus produced is treated wth 5 parts by weight of propylene oxide (or 38 parts by weight of ethylene oxide). After 12 hours of grinding the reaction is completed. The reaction product can then be neutralized with gaseous hydrogen chloride or carbon dioxide. The product is dried on air. This product is suited as an additive for pulp beaters.

*Example 4*

200 parts by weight of seed meal are ground in a ball mill together with 15 parts by weight of 30% sodium hydroxide solution. The homogenized mass thus produced is treated with 50 parts by weight of propylene oxide (or 38 parts by weight of ethylene oxide). After 12 hours of grinding the reaction is completed. The reaction product can then be neutralized with gaseous hydrogen chloride or carbon dioxide. The product is dried on air. This product is suited as binding agent for the surface refinement of paper, cardboard, pasteboard or the like cellulose products.

*Example 5*

200 parts by weight of seed meal are heated with 66 parts by weight of 30% sodium hydroxide solution and 4.0 parts by weight of ethylene chlorohydrin (or 5.5 parts by weight of propylene chlorohydrin) to 80–90° C. for three hours. The resulting product is dried on air. This product is particularly suited as an additive for pulp in pulp beaters.

*Example 6*

200 parts by weight of seed meal are heated with 66 parts by weight of 30% sodium hydroxide solution and 40 parts by weight of ethylene chlorohydrin (or 55 parts by weight of propylene chlorohydrin) to 80–90° C. for three hours. The resulting product is dried on air. It can be used with advantage as binding agent for the surface refinement of paper, cardboard, pasteboard and the like.

In cases where a fat-free etherified product is desired, the fat is extracted after bleaching, said extraction being effected by usual extracting agents. For the purpose of extraction, the bleached seeds are crushed to coarse grit. The extracted fat can be made use of.

*Example 7*

Application of the binding agent produced in accordance with the present invention for the purpose of producing paper, cardboard, pasteboard or the like cellulose products, can be effected in such a manner that four parts of the product produced according to the present process are admixed to 96 parts of cold water under agitation. In order to facilitate the uniform distribution of the binding agent produced according to the present process, the above mentioned four parts by weight of the binding agent can be agitated for about 10 minutes with four parts by weight of methyl, ethyl or isopropyl alcohol, prior to the addition to the water. If, after 10 minutes' agitation, the agitated composition is allowed to stand for about 2 hours, a product is obtained, which is completely dissolved in the respective alcohol and which is readily distributed in cold water. The solution of the binding agent is of slightly yellow colour. This yellow tint can be removed by adding to the solution an acid salt and/or an acid until the solution becomes substantially colourless. The thickness of the coating of the binding material on the paper surface depends upon the viscosity of the solution which is applied, e.g., by spreading, said viscosity being controlled by the reaction temperature and thus by the degree of break up of the seed meal substance on the one hand, and upon the degree of alkylation or hydroxyalkylation, respectively, on the other hand.

The accompanying drawing shows an exemplary flow chart of the process according to the present invention.

In the drawing, numeral 1 designates a vessel for the pretreatment of the husked seeds, said pre-treatment consisting in pre-bleaching and cleaning of the seeds. The seeds are conveyed from vessel 1 to a blanching machine 2, wherein they are subjected to a bleaching process. The bleached seeds are then introduced into a dryer 3 wherein they are dried to a water content of 10 to 20%, whereupon they are introduced into a mill 4 in which they are ground to a grain size corresponding to DIN-sieves 70–80 (DIN-German Industrial Standards). The seed meal thus obtained is introduced into a kneader 5 wherein it is mixed with sodium hydroxide solution. The mixture is then homogenized in a detacher 6, whereafter it is introduced into a reactor 7 wherein it is reacted with the alkylating agent or hydroxyalkylating agent, respectively, e.g., with propylene oxide. The reactor is suitably a ball mill, so that the reaction is effected with simultaneous grinding. The reaction product is conveyed to a dryer 8 wherein it is dried by means of hot air. The dried product is conveyed to an impact pulverizer wherein it is ground. Behind the mill 9 is a sifter 10 in which the grading to various grain sizes is effected. The coarse grain is conveyed back into the impact mill 9, whereas the fine grain is stored for use.

I claim:

1. A process for the production of a binding agent which is to be used for the production of paper, cardboard and pasteboard comprising the steps: husking seeds of *Tamarindus indica;* grinding the husked seeds to a seed meal; and treating the resulting seed meal with an aqueous methanolic solution of sodium hydroxide and a hydroxyalkylating agent selected from the group consisting of ethylene oxide, propylene oxide, ethylene chlorohydrin and propylene chlorohydrin.

2. A process according to claim 1 wherein the hydroxyalkylating agent is employed in a quantity of from about 0.1 to about 0.4 mol per mol of pyranose contained in the polysaccharide present in the seed meal of *Tamarindus indica,* based upon a polysaccharide content of the seed meal of about 70 percent.

3. A process according to claim 1 wherein the hydroxyalkylating agent is employed in a quantity of from about 0.2 to about 0.3 mol per mol of pyranose contained in the polysaccharide present in the seed meal of *Tamarindus indica,* based upon a polysaccharide content of the seed meal of about 70 percent.

4. A process according to claim 2 wherein the sodium hydroxide concentration in the aqueous methanolic solution of sodium hydroxide is from about 1 to about 3 percent, based upon the weight of the seed meal.

5. A process according to claim 2 wherein the seed meal is treated with the hydroxyalkylating agent at a temperature of from about 40 to about 150° centigrade.

References Cited by the Examiner

UNITED STATES PATENTS

| | | | |
|---|---|---|---|
| 2,190,179 | 2/1940 | Ziese et al. | 260—209 |
| 2,496,670 | 2/1950 | Moe | 260—209 |
| 2,573,072 | 10/1951 | Vassel | 260—209 |
| 2,599,620 | 6/1952 | Filbert | 260—209 |
| 2,650,917 | 9/1953 | Moe | 260—209 |
| 2,767,167 | 10/1956 | Opie et al. | 260—209 |

FOREIGN PATENTS 519,724  12/1955  Canada.

LEWIS GOTTS, *Primary Examiner.*

CHARLES B. PARKER, *Examiner.*